UNITED STATES PATENT OFFICE 2,628,215

PHENYL METHYL DIALKOXY SILANE-POLY-HYDRIC ALCOHOL-DICARBOXYLIC ACID OR ANHYDRIDE REACTION

Melvin J. Hunter and Lawrence A. Rauner, Midland, Mich., assignors to Dow Corning Corporation, Midland, Mich., a corporation of Michigan No Drawing. Application September 28, 1949, Serial No. 118,446

2 Claims. (Cl. 260—75)

This invention relates to copolymers of a silane, an alcohol and a carboxylic acid.

The applicants' copending application, Serial Number 59,414, filed November 10, 1948, now U. S. Patent No. 2,584,351, and assigned to the assignee of this invention, discloses and claims a method of preparing copolymers which involves reacting an alcohol and a silane in such proportions that there is always an excess of alcoholic hydroxyls remaining in the reaction product and thereafter reacting the hydroxyl containing material with a polybasic acid.

This invention relates to a method of preparing copolymers by reacting a polybasic acid with a silane-alcohol reaction product in which there are no hydroxyl groups. Thus, this invention relates to a new method of preparing three component copolymers containing an alcohol, a silane and an acid.

In accordance with this invention a silane of the type $R_2SiX_2$ where R is an alkyl or monocyclic aryl radical and X is chlorine or alkoxy is reacted with an equivalent amount of a dihydric alcohol and the resulting product is reacted with a polycarboxylic acid or an anhydride thereof in amount such that the ratio of the number of acid functional groups to the sum of the number of silane X radicals plus the number of alcoholic hydroxyl radicals is from 0.01 to 1.

In this invention the term "acid functional groups" has reference to the reactive groups of the acids. Each carboxyl radical constitutes one functional group while each anhydride group constitutes two functional groups. Thus, for example, both phthalic acid and phthalic anhydride have two functional groups.

The silane and the alcohol are reacted by bringing the two into contact whereupon condensation takes place with the elimination of HCl or a monohydric alcohol and the formation of a polyester having SiOC linkages. Since the reactants are employed in equivalent amounts, essentially no alcoholic hydroxyls remain in the reaction product. When alkoxy silanes are used it is desirable to employ a trace of a strong acid such as HCl or $H_2SO_4$ as a catalyst and to carry out the reaction under such conditions of temperature and pressure that the monohydric alcohol will be removed from the reaction mixture.

The silane-alcohol condensation product is reacted with a polycarboxylic acid or anhydride thereof preferably at a temperature between 100° C. and 300° C. Under these conditions of temperature reaction begins at once and proceeds smoothly as is shown by the progressive lowering of the acid number. The acid number of a material is the number of milligrams of KOH which are required to neutralize 1 g. of the material. When anhydrides are employed no water is eliminated from the reaction mixture. When acids are used water is eliminated due to the formation of acid anhydrides. It is believed that these in turn react with the silane-alcohol ester to produce the products of this invention.

One mechanism by which the reaction may occur is by the splitting of the silane-alcohol ester linkage in accordance with the following equation:

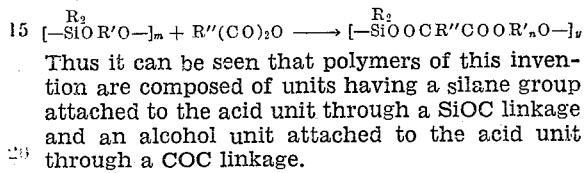

Thus it can be seen that polymers of this invention are composed of units having a silane group attached to the acid unit through a SiOC linkage and an alcohol unit attached to the acid unit through a COC linkage.

In those cases where all three components are difunctional, the products obtained by the method of this invention are viscous liquids. When the acid employed is at least trifunctional the product may be a cross-linked insoluble gel.

This invention includes within its scope any alkoxy or chlorosilane in which the R radicals are alkyl such as methyl, ethyl, propyl and octadecyl or monocyclic aryl such as phenyl, tolyl and chlorophenyl and any dihydric alcohol of the type HOR'OH where R' is a divalent organic radical such as alkylene, phenylene or cyclic alkylenes and any carboxylic acid having at least two carboxyl groups or anhydrides thereof.

Examples of such acids are saturated aliphatic acids such as succinic, adipic, oxalic and sebacic; unsaturated aliphatic acids such as fumaric and maleic; and aryl carboxylic acids such as phthalic, trimellitic and mellitic.

The products of this invention are useful as plasticizers for siloxane and organic resins, as paint vehicles and as coatings for electrical conductors. The products are of particular importance because they combine a thermal stability approaching that of polysiloxanes with desirable mechanical properties of organic resins.

The following examples are illustrative only.

*Example 1*

2 g. mols of ethylene glycol and 2 g. mols of phenylmethyldiethoxysilane were mixed and heated at 96° C. for ½ hour. The mixture was then heated at 200° C. as 173.5 g. of ethyl alcohol were removed. The reaction mixture was cooled to 115° C. and 0.5 g. mols of phthalic anhydride was added. The temperature was raised to 200° C. and the reaction was indicated by a decreasing acid number as follows:

| Hrs. heated at 200° C. | Acid Number |
|---|---|
| 1 | 48.27 |
| 5 | 15.55 |
| 16 | 5.48 |

The product was a clear viscous fluid.

Example 2

2 g. mols of phenylmethyldiethoxysilane and 2 g. mols of ethylene glycol were mixed and a trace of HCl catalyst was added. The mixture was refluxed for ½ hour at 90° C. and 177.7 g. of ethyl alcohol was removed as the temperature was raised to 180° C. 189 g. of the reaction product were mixed with 0.25 g. mols of maleic anhydride and heated as follows:

| Temp., °C. | Hrs. heated | Acid number |
|---|---|---|
| 157 | 0 | 30.65 |
| 157 | 4 | 20 |
| 150 | 8 | 17.5 |
| 167 | 12.5 | 11.7 |

During the reaction only 0.15 g. of water was obtained showing that the reaction did not proceed through combination of the acid with OH groups. The saponification number of the reaction product was found to be 149 thus showing the acid was presented in combined form.

Example 3

189 g. of the phenylmethyldiethoxysilane-ethylene glycol reaction product of Example 2 was mixed with 0.25 g. mols of fumaric acid and the mixture was heated at 160° C. with the results shown below:

| Hrs. heated | Acid Number |
|---|---|
| 0 | 29 |
| 3 | 14.1 |
| 4.5 | 7.8 |
| 8.5 | 3.81 |
| 12.5 | 3.44 |
| 16.5 | 2.71 |

In this case 8.9 g. of water distilled which was formed by the condensation of the fumaric acid to form polymeric anhydrides thereof. The saponification number of the finished product was 138.

Example 4

1.5 g. mols of phenylethyldichlorosilane was mixed with 1.5 g. mols of trimethylene glycol. Reaction proceeded at room temperature with the elimination of HCl. When this reaction product is mixed with 2 g. mols of trimellitic acid and heated at a temperature of 160° C. a viscous reaction product is obtained.

That which is claimed is:

1. The method of preparing copolymeric materials which comprises reacting phenylmethyldiethoxysilane with an equimolecular amount of ethylene glycol and reacting the resulting product at a temperature between 100° C. and 300° C., with an acidic compound selected from the group consisting of dicarboxylic acids and anhydrides thereof, in amount such that the ratio of the number of acid functional groups to the sum of the number of ethoxyl radicals plus hydroxyl radicals is from 0.01 to 1.

2. The method of preparing copolymeric materials which comprises reacting a phenylmethyldialkoxysilane with an equal molecular amount of a dihydric alcohol and reacting the resulting product at a temperature between 100° C. and 300° C., with an acidic compound selected from the group consisting of dicarboxylic acids and anhydrides there, in amount such that the ratio of the number of acid fundamental groups to the sum of the number of alkoxy radicals plus hydroxyl radicals is from 0.01 to 1.

MELVIN J. HUNTER.
LAWRENCE A. RAUNER.

REFERENCES CITED

The following references are of record in the file of this patent:

UNITED STATES PATENTS

| Number | Name | Date |
|---|---|---|
| 2,386,793 | Hanford | Oct. 16, 1945 |
| 2,413,582 | Rust et al. | Dec. 31, 1946 |
| 2,500,843 | MacKenzie et al. | Mar. 14, 1950 |
| 2,529,956 | Myles et al. | Nov. 14, 1950 |

FOREIGN PATENTS

| Number | Country | Date |
|---|---|---|
| 583,754 | Great Britain | Dec. 30, 1946 |